May 18, 1926.
J. H. FISHER
AUTOMATIC VALVE STRUCTURE
Filed June 11, 1923
1,585,479
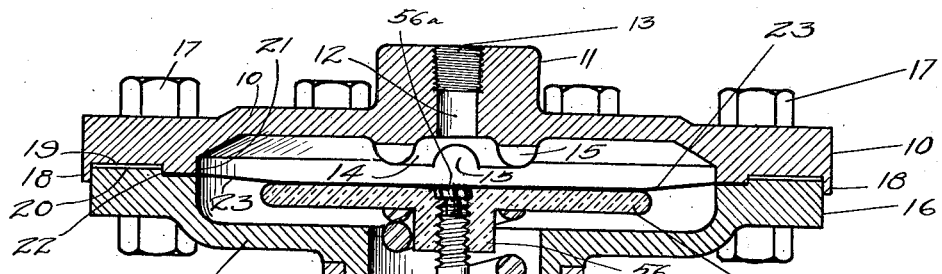
INVENTOR.
Jasper H. Fisher,
BY
Bair & Freeman
ATTORNEYS Patented May 18, 1926.

1,585,479

UNITED STATES PATENT OFFICE.

JASPER H. FISHER, OF MARSHALLTOWN, IOWA, ASSIGNOR TO THE FISHER GOVERNOR COMPANY, OF MARSHALLTOWN, IOWA.

AUTOMATIC VALVE STRUCTURE.

Application filed June 11, 1923. Serial No. 644,716.

My invention relates to automatic valve structures of the type used for controlling the flow of gas for instance to heated boilers, and in which the valve is controlled by pressure.

It is the object of my invention to provide an automatic valve structure of simple, durable and inexpensive construction.

A further and more particular object of my invention is to provide a valve structure of the kind under consideration of convenient arrangement and construction of parts for assembling and disassembling and for providing access to the various parts.

A further object is to provide in such a structure a novel means for mounting and controlling the movement of the valve.

A further object is to provide novel structure for arranging a diaphragm and a diaphragm head in connection with each other and the valve stem.

A further object is to provide suitable means for providing tension and for regulating the tension on the diaphragm.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a vertical, sectional view through an automatic valve structure embodying my invention.

Figure 2 shows a horizontal, sectional view taken on the line 2—2 of Figure 1, and Figure 3 is a diagrammatical view of my valve piped up to a boiler.

In the drawings herewith, I have used the reference numeral 10 to indicate generally the upper member of a diaphragm chamber. The diaphragm chamber member 10 has at its top an upwardly projecting boss or the like 11 through which extends a passage 12, which may be screw-threaded as at 13 for connection with a steam chamber of a boiler or the like.

On the under side of the diaphragm chamber member 10 at about the middle thereof is an annular downwardly extending rib 14, which has a plurality of notches or recesses 15. Below the member 10 is the lower diaphragm chamber member 16 preferably secured to the member 10 by means of bolts 17 or the like.

The flange 19 has a peripheral, downwardly projecting flange 18 overhanging the edge of the member 16.

The member 10 has near its outside edge a flange 19, the lower face of which is below the level of the interior central part of the member 10.

The member 16 has at its outer edge a flange 20 the upper surface of which is above the level of the inner central part of the member 16 as shown in the drawings.

At the inner portion of the flange 19 of the member 10 is a downwardly projecting rib 21 adapted to coact with a rabbet 22 in the upper surface of the flange 20.

A diaphragm 23 has its outer edge received between the rib 21 and the rabbet 22. The diaphragm 23 may be of any suitable type, for instance it may be of two or more sections of phosphor bronze sheet so laminated that it will eliminate crystallization of metal and be more sensitive than one single sheet, and have more strength than a single sheet of the same thickness as the several sheets used.

At the central portion of the member 16 is a downwardly projecting tubular member 24 through which extends a passage 25. The tubular member 24 is exteriorly screw-threaded and is screwed into a tubular member 26, which is closed at its upper end by the end member 27.

Extending down from the end 27 are arms 28, which may be inclined toward each other and are connected at their lower ends by a split ring 29, which has a central screw-threaded opening and the projecting arms 29ª which may be adjustably drawn together by the screw bolt 29ᵇ.

The tubular fitting 30 is exteriorly screw-threaded and is screwed into the opening in the ring 29. The member 30 has at its lower end an annular shoulder 31, as shown, and below the shoulder 31 is an annular flange 32 from which there projects downwardly the annular flange 33, which is exteriorly screw-threaded.

The member just described comprises a cap for the valve body 34 and a sleeve for the valve stem 47 hereinafter referred to.

The globe angular valve body 34 has an opening at its upper end into which the flange 33 is screwed as shown. The valve body 34 has the interiorly screw-threaded inlet and outlet openings 35 and 36 spaced horizontally from each other at opposite ends of the body.

The interior of the body 34 is divided into an inlet chamber 37 and an outlet chamber 38 by means of an interior partition 39, which is provided with the central, vertical opening 40 above which is formed the valve seat 41.

A passage 42 through the valve body 34 communicates with the intake chamber 37. Below the opening 40 is a hollow socket 43. A flat-faced valve 44 coacts with the valve seat 41 and has a guide rod 45 projecting downwardly and slidably guided in the socket 43. The valve 44 has an upwardly projecting interiorly screw-threaded socket 46.

I provide a valve stem 47 projecting into the socket 46 and having the head 48 at its lower end having play in the socket, as shown, to insure the true seating of the valve. The head 48 is locked into the socket 46 by means of a screw plug 49 screwed into the socket 46.

The stem 47 extends slidably upwardly through the tubular member 30. The upper portion of the passage through the member 30 is enlarged and receives packing 50 above which is a packing gland 51, which is held pressed against the packing 50 by means of a cap 52 screwed onto the member 30.

The stem 47 is slidably extended through the cap 52 as shown and then upwardly through the end 27 which has a screw-threaded opening 53 therein.

Screwed onto the upper end of the stem 47 is a flat plate or diaphragm head 54, which rests adjacent to the under surface of the diaphragm 23. Mounted on the stem 47 to permit the sliding movement of the stem is an exteriorly threaded, headed sleeve 55 having an opening through it to receive the stem 47, as illustrated.

The sleeve 55 is screwed into the screw-threaded opening 53. The diaphragm head 54 has a central, downwardly projecting, annular boss 56. The upper end of the stem 47 is screwed into the boss 56 and is locked therein by a lock screw 56$^a$ entering the suitable threaded opening in the upper part of the head 54. Resting on the upper end of the sleeve 55 is a plate 57 having a central opening to receive the stem 47 and to permit sliding movement of the stem.

The plate 57 has a central, upwardly projecting annular boss 58. A coil spring 59 is received on the stem 47 and rests on the plate 57 and against the diaphragm head 54 with the boss 58 and the boss 56 received as shown.

In the use of the valve structure shown herein, the intake end of the globe valve body 34 is connected with a source of gas supply 60, while the outlet end is connected with a burner 61 or the like for a boiler 62, such for instance as the kind used with machines for pressing garments. The passage 12 is connected as by a pipe 63 with the boiler, so that the upper surface of the diaphragm may be subject to the steam pressure therein.

The passage 42 is designed to be connected by suitable tubing 64 with the pilot light of the burner.

The tension of the spring 59 on the diaphragm head may be regulated by adjustment of the screw 55.

The device is set so as to normally hold the valve 44 slightly open and by regulating the screw 55, the operator may determine the amount of pressure required on the diaphragm for closing the valve.

The gas passes through the inlet 35, the inlet chamber 37, the opening 40, the outlet chamber 38 and the outlet 36 to the burner 61.

When the burner has generated steam until a predetermined pressure has been secured, the pressure of the steam against the upper surface of the diaphragm 23 will force the diaphragm head downwardly against the tension of the spring 59 for reducing the flow of gas, and if the pressure becomes high enough for closing the valve 44, will thus shut off the supply to the burner 61.

It is thus obvious that the steam will be kept at a predetermined pressure since the pressure of the steam controls the degree of opening of the valve 44 and the flow of gas to the burner, whereby the steam is generated.

My improved automatic valve structure has a number of advantages, many of which may be seen from the foregoing construction.

The peculiar mounting and connections of the valve 44 will effect a true and smooth setting at all times.

The arrangement of the diaphragm head is such as to be effective without the necessity for fastening the diaphragm to the head 54.

Ample adjustment is permitted by means of the connection between the stem 47 and the head 54, and the adjustment of the screw 55.

The structure is very simple and the entire device may be made at a reasonable expense. It will not easily get out of order and can be quickly and easily repaired.

One important advantage of the device herein shown lies in the construction and arrangement of the parts, which facilitate the quick and easy assembling of the device and the easy disassembling of the device.

For instance, if it is desired to put in a new valve 44, the globe valve body 34 may be unscrewed from the flange 33 and lowered away from the valve, whereupon the valve can quickly and easily be removed by unscrewing the plug 49 and a new valve may be substituted.

If access to the diaphragm is desired, the bolts 17 are removed, and the upper diaphragm chamber member 10 may be lifted off, permiting access to the diaphragm, the diaphragm head and the spring. Access is provided to the cap 52 and the screw 55 without interfering with or taking apart the other parts of the device.

It will be noted that the provision of the rib 14 with the recess 15 prevents the sealing of the diaphragm around the opening 12.

Some changes may be made in the construction and arrangement of the various parts of my improved automatic valve structure without departing from the real spirit and purpose of my invention, and it is my intention to cover by my claim, any modified forms of structure or use of mechanical equivalents, which may be included within its scope.

I claim as my invention:

In a device of the class described, the combination of a valve structure, including a casing, a valve therein having a projecting stem, said casing having an opening of sufficient size to admit the valve, a detachable cap for closing said opening in the casing forming a sleeve for the stem, with a pressure sensitive device comprising a pressure sensitive element operatively connected with the stem, a support therefor, adjustable means carried by the support for imparting tension on said element in one direction, and means for adjustably mounting said support on said cap and for locking the support in any position of said adjustment, whereby the pressure sensitive device, valve, and cap may be assembled and adjusted as a unit and then mounted on the valve casing by mounting the cap thereon.

JASPER H. FISHER.